United States Patent [19]
van Beukering

[11] 3,968,699
[45] July 13, 1976

[54] DRIVE SYSTEM

[75] Inventor: Henricus Cornelis Johannes van Beukering, Eindhoven, Netherlands

[73] Assignee: U.S. Philips Corporation, New York, N.Y.

[22] Filed: June 6, 1974

[21] Appl. No.: 476,891

[30] Foreign Application Priority Data
June 22, 1973  Netherlands............... 7308702

[52] U.S. Cl..................................... 74/60; 91/499
[51] Int. Cl.²........................................ F16H 23/00
[58] Field of Search............. 74/60; 91/499, 507

[56] References Cited
UNITED STATES PATENTS

| | | | |
|---|---|---|---|
| 2,250,608 | 7/1941 | Sherman | 74/60 |
| 2,302,995 | 11/1942 | Holmes | 74/60 |
| 2,480,525 | 8/1949 | Van Weenen | 74/60 X |
| 3,289,604 | 12/1966 | Wahlmark | 91/507 X |
| 3,411,608 | 11/1968 | Thoma | 91/499 |

FOREIGN PATENTS OR APPLICATIONS

| | | | |
|---|---|---|---|
| 371,069 | 4/1932 | United Kingdom | 74/60 |

*Primary Examiner*—Martin P. Schwadron
*Assistant Examiner*—H. Burks, Jr.
*Attorney, Agent, or Firm*—Frank R. Trifari; J. David Dainow

[57] ABSTRACT

A swash-plate transmission drive system including a rotary driven shaft, reciprocally movable drive shafts, a swash plate secured on said driven shaft, and sliding members, each having a flat surface engaging said plate and a spherical surface engaging one of said drive shafts.

14 Claims, 9 Drawing Figures

DRIVE SYSTEM

BACKGROUND OF THE INVENTION

The invention relates to a drive system comprising a shaft which is journalled to be rotatable in a frame and on which a plate is provided which cooperates with at least one sliding body. One flat side of the body cooperates with a running surface on the side of the plate which faces said body, this running surface being formed by a face which encloses an angle with the center line of the rotatable shaft. The sliding body is provided with a spherical face which cooperates with a corresponding face in a head of a drive rod, the arrangement being such that when the shaft rotates, the sliding body and the drive rod cooperating therewith perform a reciprocating movement.

Drive systems of the kind set forth are known and are referred to as swash-plate drive systems, as used in pumps, compressors and engines, in particular in hot-gas reciprocating engines, for imparting a given movement to the pistons, the reciprocating movement of the pistons being converted into a rotary movement of the plate and the shaft connected thereto. The forces of the pistons are then transferred to the plate by way of a sliding body. In order to limit the friction between and the wear of the sliding bodies and the plate, proper lubrication is required.

British patent specification No. 1,165,364 describes a drive system of the kind set forth in which the sliding bodies which are constructed as half spheres, bear on the flat plate by way of a hydrostatic lubrication film. Such a hydrostatic lubrication produces proper separation of the two surfaces, but the construction is complex and expensive.

In order to obtain a hydrodynamic lubrication film between sliding body and plate it has already been proposed to construct the side of the sliding body which cooperates with the plate to be slightly convex with a very large radius of curvature. This produces a wedge between sliding body and plate in which the lubricant is forced during operation, so that a lubrication film is obtained between sliding body and plate.

This rather simple step produces proper lubrication; however due to the wear occurring on the rather small sphere segment surface, particularly during starting, the convex shape will be lost after a comparatively short time, so that the body becomes flat and hydrodynamic lubrication no longer takes place.

SUMMARY OF THE INVENTION

In order to eliminate this drawback and to provide a drive system which, using simple means, produces a hydrodynamic lubrication effect for a very long service period, the drive system according to the invention, is characterized in that the running surface of the sliding bodies on the plate surface is formed by a face which is constructed to be convex at least in the relative movement direction of sliding bodies and running surface.

As a result of providing the curved surface on the plate instead of on the sliding body, a very favorable hydrodynamic lubrication is obtained, and the effect of the wear occurring will not be noticed at all, or only after a prolonged period of time, because the surface area of the running surface is many times larger than that of the sliding body.

Even though the running surface cannot only be curved in the relative movement direction, but also in the directions transverse thereto, the hydrodynamic lubrication is substantially enhanced if there is no difference in curvature of sliding body and running surface in the direction transverse to the movement direction, because the minimum lubrication film thickness is then larger for the same speeds, forces and sliding body dimensions.

A further preferred embodiment of the drive system according to the invention is characterized in that the running surface is composed of straight lines each of which extends in a radial plane through the center line of the rotatable shaft. In this embodiment there will always be line contact (without lubrication) between sliding body and running surface. A very favorable hydrodynamic lubrication is then ensured during movement. A face of this kind is easier to manufacture than a surface which is curved in all directions. Because the sliding body extends over a given width of the rotating running surface, a given difference will occur in the speed of the points of the sliding body situated at different radii. As a result, a torque will be exerted on the sliding body so that the latter will be subjected to rotation. This ensures uniform wear of the sliding body in all directions, so that the body will always remain perfectly flat.

A further preferred embodiment of the new drive system, in which each of the sliding bodies is a half sphere accommodated in a bowl-like recess in the head of the associated drive rod, is characterized in that the relevant straight lines which together constitute the running surface, all pass through the ellipse obtained by intersection of a cylinder which passes through the centers of said bowl-like recesses, the center line of the rotatable shaft being the axis of the cylinder, by a plane which extends through the center of the bowl-like recess and which encloses an angle with the center line of the rotatable shaft.

In a further embodiment the relevant straight lines all enclose the same angle with said plane through the center of the bowl-like recess. And in another embodiment, at least the running surface is formed by a part of a conical surface with straight describing lines, the cone axis thereof enclosing an angle with the center line of the rotatable shaft. A conical surface of this kind, of course having a rather large top angle, can be readily manufactured.

Another preferred embodiment of the drive system according to the invention is characterized in that the straight lines which together constitute the running surface, are each tangent to a torus of constant diameter about the ellipse which is obtained by intersection of a cylinder whose axis is the center line of the rotatable shaft and which passes through the center of the relevant bowl-like recesses, by a plane extending through the centers of the bowl-like recesses and enclosing an angle with the center line of the rotatable shaft. The radius of the torus is equal to the difference between the radius of the bowl-like recesses and the height of camber of the sphere segments forming the sliding bodies. In this embodiment the reciprocating movement of the drive rod is determined only by the angle at which the plane of the ellipse intersects the center line of the rotatable shaft.

The foregoing description concerns only drive rods which bear on the swash plate by way of one sliding body. In that case the drive rod can readily follow the contour of the running surface. The matter becomes more complex, however, if, as in a further embodiment of the drive system according to the invention, each of the drive rods is provided with a drive rod head comprising two spherical faces which face each other or which are remote from each other, each face cooperating with a sliding body, the flat side of which cooperates with a running surface on the plate which is connected to the rotatable shaft. Consequently, in this case the plate passes between the two sliding bodies, or the sliding bodies are situated in a groove in the plate. This means that the thickness of the plate between the two running surfaces may not vary or at least may not vary more than by the permissible clearance variation between the plate and the two sliding bodies on both sides of the plate.

In order to satisfy this requirement, this drive system is characterized in that each of the two running surfaces is formed by a set of straight lines, each of these straight lines of each running surface being at least substantially tangent to a torus of constant diameter about the ellipse obtained by intersection of a cylinder whose axis is the center line of the rotatable shaft and which extends through the center of the relevant spherical face, by a flat plane extending through the center of the relevant spherical face; these two faces are parallel to each other, the radius of the torus associated with each of the running surfaces being equal to the length of the sector from the center of curvature of the spherical face on the flat side of the sliding body.

By constructing the running surfaces as described above, it is achieved that the two running surfaces can always pass properly between the sliding bodies with the same clearance. This will be described in detail hereinafter with reference to the Figures. The straight lines tangent to the torus can occupy different positions as desired, be it that the running surfaces must always be convex in the movement direction.

In a further preferred embodiment, all straight lines of each running surface which are tangent to the associated torus enclose the same angle with the plane through the central line of the torus. Another preferred embodiment yet of the drive system according to the invention is characterized in that the straight lines of each running surface which are tangent to the associated torus form part of a conical surface, the symmetry axis of which intersects the center line of the rotatable shaft at an angle at the point at which the plane through the central line of the torus intersects the center line.

The invention furthermore relates to a hot-gas reciprocating engine, comprising one or more cylinders which are regularly spaced about a central shaft, each cylinder accommodating one or more pistons for varying the volume of a hot space and a cold space, said spaces communicating with each other via a cooler, regenerator and heater, said engine according to the invention being provided with a drive system as described above.

A very compact hot-gas engine can thus be obtained, comprising an outgoing shaft which is arranged centrally between and parallel to the cylinders.

The invention will be described in detail hereinafter with reference to the drawings.

DETAILED DESCRIPTION OF THE PREFERRED EMBODIMENT

Figure 1:
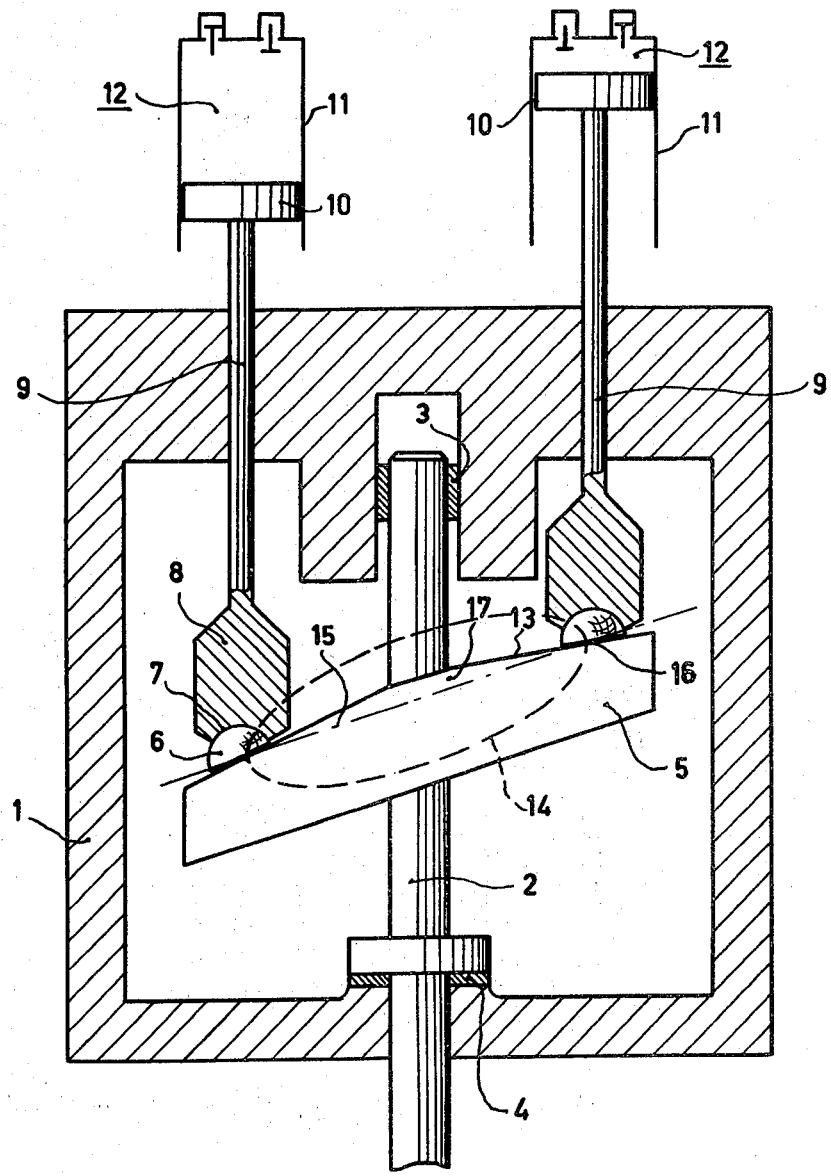
FIG. 1 is a diagrammatic view of a device comprising a drive system in which the piston rods cooperate with only one side of the plate.

The reference numeral 1 in FIG. 1 denotes a frame in which a shaft 2 is journalled to be rotatable by way of bearings 3 and 4. A plate 5 is rigidly connected to the shaft 2. Cooperating with the upper side of the plate 5 are sliding bodies 6 which are shaped as half spheres, the convex side of each body being accommodated in a bowl-like recess 7 in the head 8 of a drive rod 9. Each of the drive rods 9 is guided in the frame 1 and is provided with a piston 10 which is accommodated in a cylinder 11. The cylinders 11 may be cylinders of a pump, compressor, hot-gas engine, etc., it being assumed that in this case a positive pressure always prevails in the spaces 12 in the cylinders 11, such that the sliding bodies 6 always remain in contact with the plate 5.

So as to obtain a hydrodynamic lubrication film between sliding bodies 6 and the upper side of plate 5, the upper side of plate 5 is constructed as a conical surface 13, all describing lines of which extend through the ellipse 14 which is obtained when the cylinder going through the center lines of the piston rods 9 is intersected by the flat plane 15 which extends through the centers 16 of the bowl-like recesses 7. A running surface for the sliding bodies 6 is thus obtained which is curved in the direction of relative movement of the sliding bodies 6 and the plate 5. If there is no lubrication, the half spheres 6 are thus in line contact with this running surface in the same manner as if they were in contact with a cylinder.

Consequently, a wedge-shaped opening always exists between the sliding bodies 6 and the running surface in the direction of movement. Hydrodynamic pressure will be built up in the lubricant in this wedge. Even though in this case, a conical surface extending through the ellipse 14 and having an axis 17 which encloses an angle with the center line of the shaft 2, is chosen as the running surface, it is to be noted that any face which is convex in the movement direction can be used.

Figure 2:
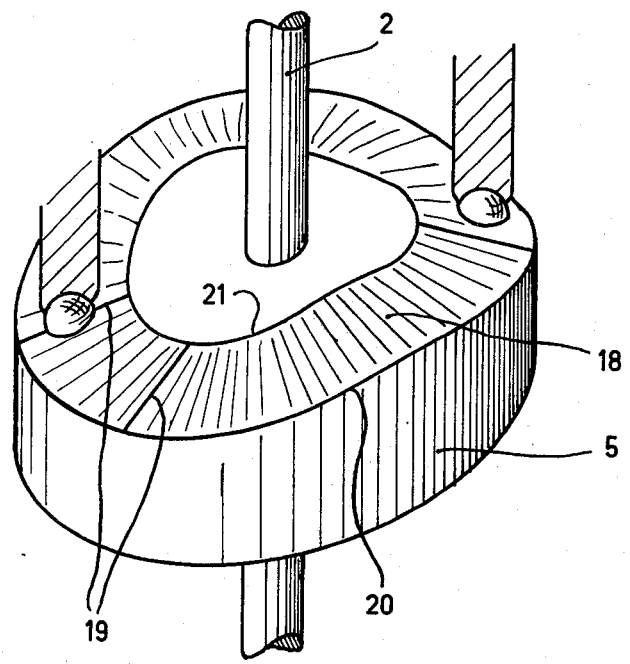
FIGS. 2 and 3 show a different embodiment of the drive system of FIG. 1.

FIG. 2 shows a shaft 2 having connected thereto a plate 5 whose running surface 18 for the half spheres 6 is formed by a set of straight lines 19 which all intersect the center line of the shaft 2 at a short distance and which extend between two rather arbitrary, axially shifted curves 20 and 21. It will be obvious that the reciprocating movement of the half spheres 6 and hence of the pistons 10 is much more complex than when the running surface 18 is formed by a plane which extends through the ellipse 14 through the centers of bowl-like recesses 7. Instead of consisting of a set of straight lines 19 so that the running surface is curved only in the movement direction, it is alternatively possible to compose the running surface 18 from a set of lines which are also convex in the radial direction. The half spheres 6 will only be in point contact with such a running surface. Line contact will be referred in most cases.

Figure 3:
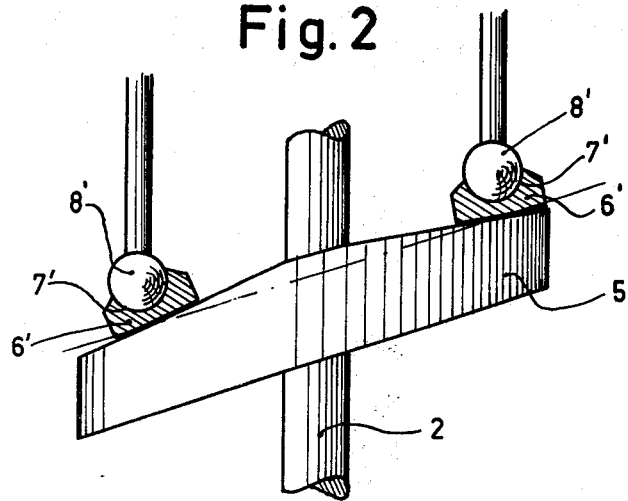

FIG. 3 shows another embodiment of the drive system shown in FIG. 1. In this drive system the sliding body 6' is provided with a hollow bowl-like recess 7' which cooperates with a spherical drive rod head 8'. The operation and the further construction of this drive system are fully in accordance with FIG. 1.

For the preceding Figures it was assumed that the sliding bodies 6 always remain pressed against the plate 5 by an adequate positive pressure in the spaces 12. However, in many cases negative pressures will occur in the spaces 12, or mass inertia forces will cause the pistons and everything connected thereto to overshoot or, if the pistons are designed to be double-acting, forces of changing directions will urge the sliding bodies away from the plate 5. In all such cases it is necessary to locate the piston rods in two directions. An example of such a device is diagrammatically shown in FIG. 4. This example concerns a double-acting hot-gas engine comprising four cylinders 25, in each of which a piston 26 is capable of varying the volume of a cold space 27 and that of a hot space 28. The hot space 28 of the one cylinder communicates, via a heater 29, a regenerator 30 and an only partly shown cooler 31, with the cold space 27 in a different cylinder. The pistons 26 are provided with drive rods 32, each of which comprises a drive rod head 33 which is now provided with two facing bowl-like recesses 34 and 35, each of which accommodates a sliding body 36, 37 shaped as a half sphere. The half spheres 36 and 37 each cooperate with one side of a plate 38 which is connected on a shaft 39 which is journalled to be rotatable in a frame 40.

So as to achieve a hydrodynamic lubricating effect between the half spheres 36, 37 and their running surfaces, the latter should again be curved in the movement direction. However, careful attention must now be paid to the geometry of the running surfaces because the thickness of the plate 38 may not vary, or at least not more than the admissible play, because otherwise either the plate is jammed between the relevant half spheres or the play temporarily becomes too large; this is liable to give rise to undesired noise and wear.

Figure 4:
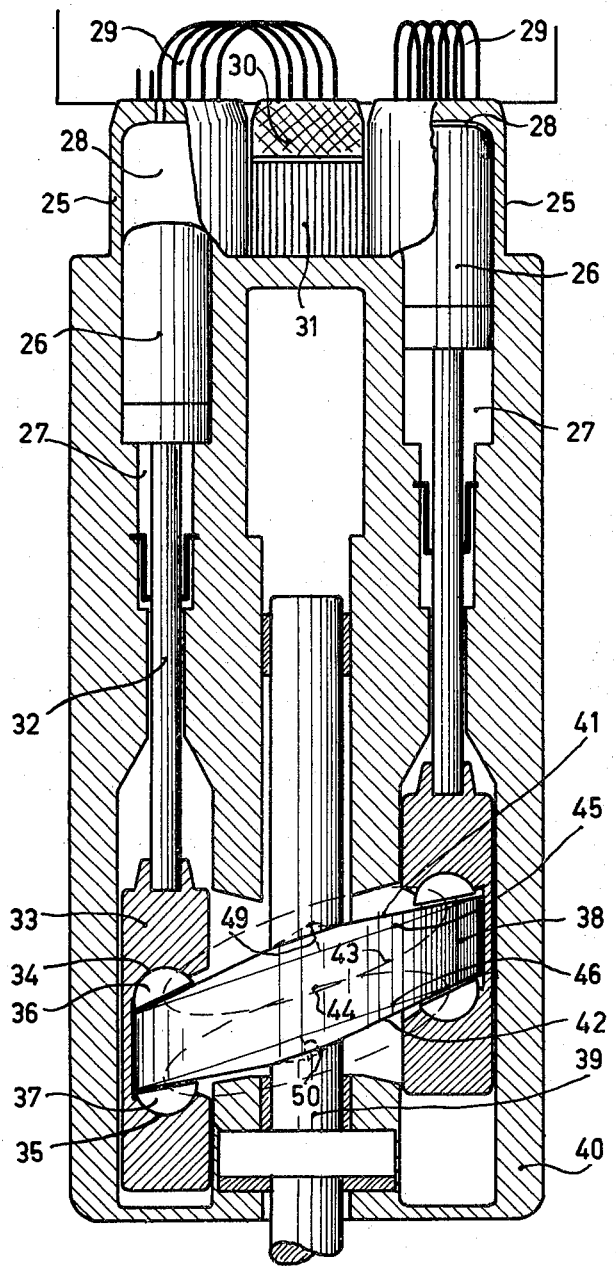
FIG. 4 is a diagrammatic view of a hot-gas engine comprising a drive system in which the rotating plate guides the drive rods in two directions.

So as to prevent this, in the engine shown in FIG. 4 each of the sides of the plate 38 is formed by a conical surface 41 and 42. Each of these conical surfaces 41, 42 passes through the ellipse 43, 44 which is obtained by intersecting a cylinder through the centers of the bowl-like recesses 34, 35 by a flat plane 45, 46, likewise through the centers 47, 48 of the bowl-like recesses 34, 35. The axis 49, 50, respectively, of each of the conical surfaces then encloses the same angle with the center line of the shaft 39. A double-acting swash-plate drive system is thus obtained, i.e., it can drive the piston rods 32 in both movement directions, and it is provided on both sides with running surfaces which are curved in the relative movement direction. In this case half spheres 36, 37 are used as the sliding bodies. It will be obvious that the sliding bodies, if desired, may also be constructed as shown in FIG. 3.

Figure 5:
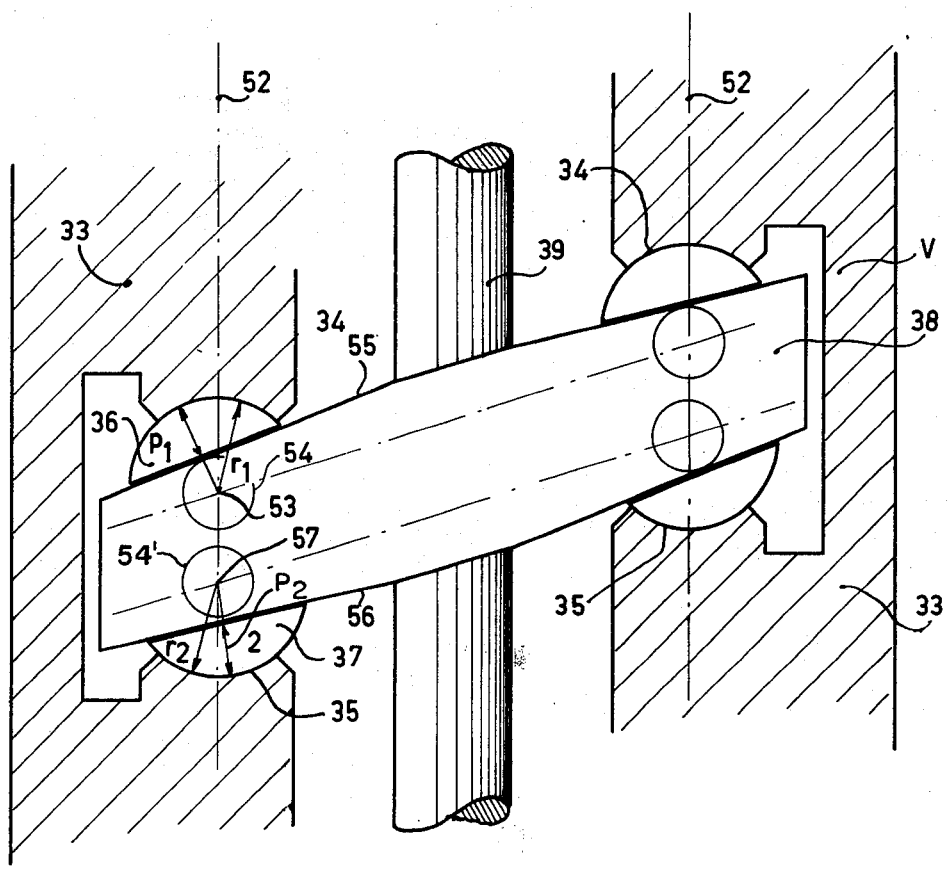
FIG. 5 is a diagrammatic view of a more general embodiment of the drive system used in the engine shown in FIG. 4.

The drive system is shown again at a larger scale in FIG. 5, the half spheres being replaced by sphere segments having a height of camber which is smaller than the radius of the bowl-like recesses. The same references as in FIG. 4 have been used as much as possible for this drive system. For example, the shaft is denoted by 39 and the plate connected thereto by 38.

The drive rod heads are denoted by 33, and each comprises a bowl-like recess 34 on the upper side of plate 39 and a bowl-like recess 35 on the lower side. The bowl-like recesses 34 accommodate sphere segments 36 having a height of camber $P_1$, and the bowl-like recesses 35 accommodate sphere segments having a height of camber $P_2$. The radius of the bowl-like recesses 34 is $r_1$ and that of the bowl-like recesses 35 is $r_2$.

Assumed to be present about the ellipse obtained by intersecting the cylinder through the lines 52 through the centers of the bowl-like recesses 34, by a flat plane V through the center 53 of the bowl-like recesses 34, is a torus 54 having a radius which corresponds to the difference $r_1 - P_1$; a conical surface 55 is then construed having describing lines which are tangent to torus 54.

Similarly, on the lower side of plate 38 a conical surface 56 is construed, all describing lines of which are tangent to the torus 54 about the ellipse through the center 57 of the bowl-like recesses 35.

Two running surfaces 55, 56 for the sphere segments are thus obtained which are shaped such that the sphere segments can always adapt themselves, while rotating about the centers 53 and 57 of the bowl-like recesses, to the position of the said surfaces, the distance between the centers 53 and 57 not being changed, with the result that the plate and the sphere segments will never be jammed in the drive rod heads.

In the drive system shown in FIG. 5, the radii $r_1$ and $r_2$ of the bowl-like recesses 34 and 35 have been chosen to be equal, and heights of camber $p_1$ and $p_2$ are also equal. This is not necessary. The radii $r_1$ and $r_2$ and the heights of camber $P_1$ and $P_2$ can be chosen to be equal or different as desired.

It will be obvious that the drive system shown in FIG. 4 is a particular case in which the height of camber of the sphere segments (half spheres) is exactly equal to the radius of the bowl-like recesses. This means that now the radius of the associated torus becomes zero, and that the conical surfaces pass through the ellipses through the centers of the bowl-like recess.

Figure 6:
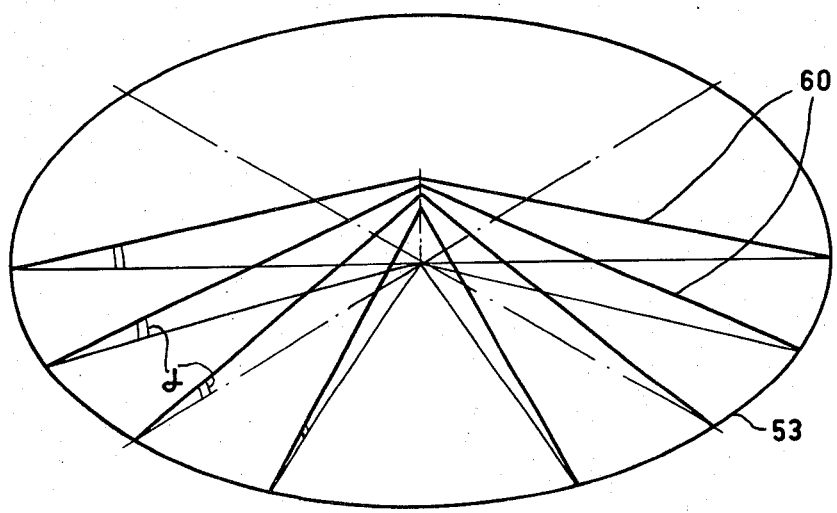
FIG. 6 shows a variation of the running surfaces of the drive system shown in FIG. 5.

Instead of constructing the surfaces 55 and 56 as true conical surfaces, it is alternatively possible to use other sets of straight lines which are tangent to the relevant toruses. For example, a set of straight lines can be used such that all straight lines on the one side are tangent to the relevant torus and on the other side enclose the same angle with the plane through the central line (ellipse) of the torus. A plane of this kind is shown in FIG. 6 in which, like in FIG. 4, the torus has been reduced to the ellipse 53 itself for better clarity of the drawing. The straight lines 60 all enclose the same angle with the plane of the ellipse 53.

Even though the foregoing description mentioned planes which are exactly tangent to the relevant toruses or which pass exactly through the ellipse, it will be obvious that small deviations are admissible, because the sphere segments have some play with respect to the running surfaces and the bowl-like recesses. If the said deviations are small, the variation in the play occurring will still be admissible.

Figure 7:
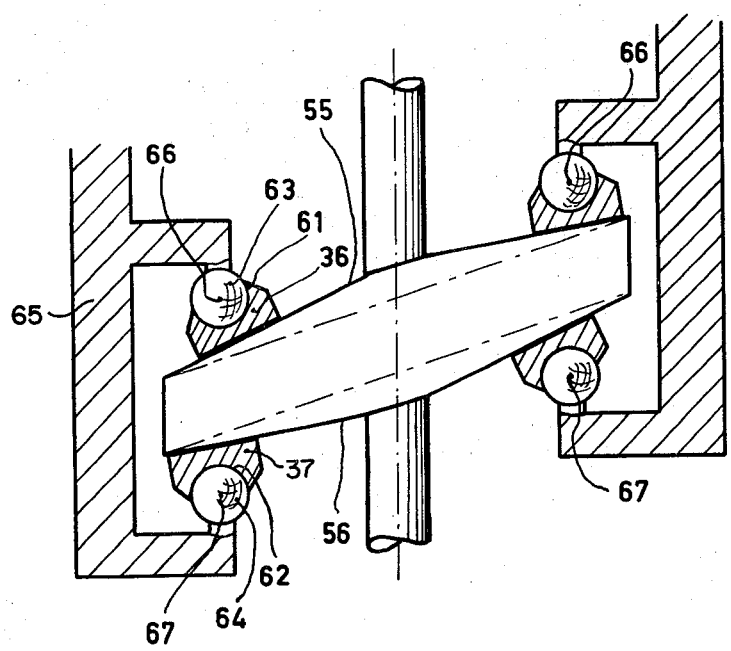
FIG. 7 shows another embodiment of the drive system shown in FIG. 5, and FIGS. 8 and 9 are diagrammatic views of drive systems in which sliding bodies are accommodated in a groove of the plate.

FIG. 7 is a diagrammatic view of a drive system of the relevant kind in which the sliding bodies 36, 37 comprise a hollow bowl-like recess 61, 62, respectively, each of which cooperates with a spherical portion 63, 64, of a drive rod head 65. The faces 55, 56 are construed as a number of straight lines which are all tangent to a torus about the centers 66, 67 of the spherical portions 63 and 64 respectively. The further construction and operation of this drive system will be obvious on the basis of the foregoing.

Figure 8:
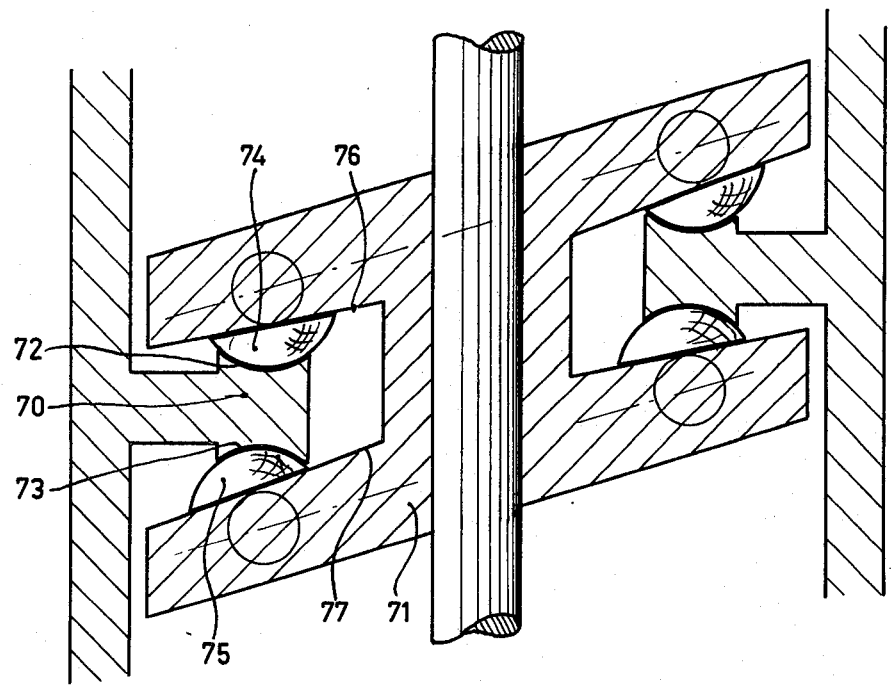
Figure 9:
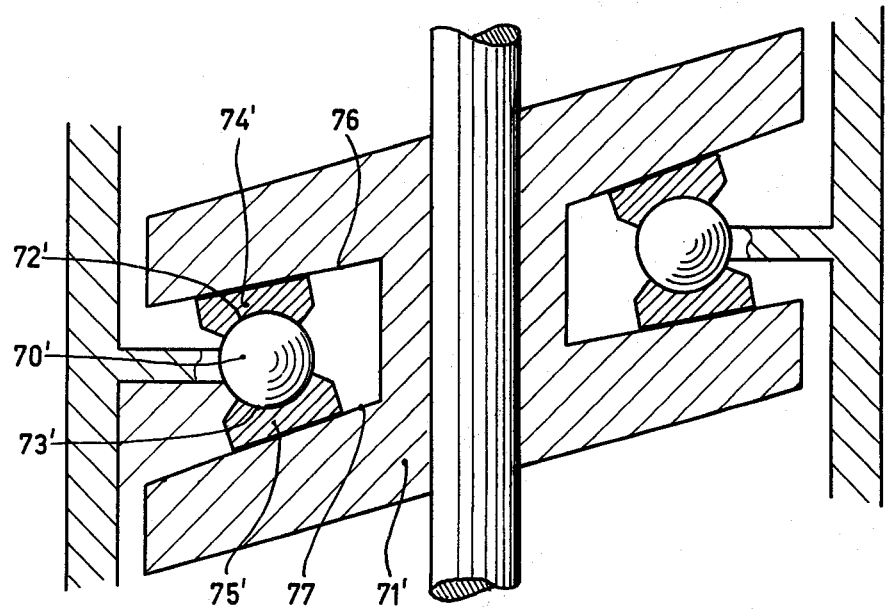

Finally, FIGS. 8 and 9 show two embodiments of drive systems in which the drive rod head 70 is situated in a groove in the side of the plate 71 in FIG. 8, and drive rod head 70' is situated in a groove in the side of the plate 71'. The drive rod heads 70 and 70' are again provided with two concave and convex faces 72, 73, and 72', 73' respectively, which cooperate with either sphere-segment shaped sliding bodies 74 and 75, or sliding bodies 74' and 75' which are provided with bowl-like recesses. The running surfaces 76 and 77 are again slightly conical and construed in the same manner as in the drive systems shown in FIGS. 5 and 7, so they need not be elaborated herein.

What is claimed is:

1. A drive system comprising a shaft which is journalled to be rotatable in a frame and on which a plate is provided which cooperates with at least one sliding body, one flat side of which cooperates with a running surface on the side of the plate which faces said body, the said running surface being formed by a face which encloses an angle with the center line of the rotatable shaft, the sliding body being provided with a spherical face which cooperates with a corresponding face in a head of a drive rod, the arrangement being such that when the shaft rotates, the sliding body and the drive rod cooperating therewith perform a reciprocating movement, characterized in that the running surface is formed by a face which is constructed to be convex at least in the relative movement direction of sliding body and running surface.

2. A drive system as claimed in claim 1, characterized in that the running surface is composed of straight lines, each of which extends in a radial plane through the central line of the rotatable shaft.

3. A drive system as claimed in claim 1, in which each of the sliding bodies is a half sphere accommodated in a bowl-like recess in the head of the associated drive rod, characterized in that the relevant straight lines which together constitute the running surface all pass through the ellipse obtained by intersection of a cylinder which passes through the centers of the said bowl-like recesses, the center line of the rotatable shaft being the axis of the cylinder, by a plane which extends through the centers of the bowl-like recesses and which encloses an angle with the center line of the rotatable shaft.

4. A drive system as claimed in claim 3, characterized in that the relevant straight lines which constitute the running surface all enclose the same angle with the said plane through the centers of the bowl-like recesses.

5. A drive system as claimed in claim 1, characterized in that at least the running surface is formed by a part of a conical surface with straight describing lines, the cone axis thereof enclosing an angle with the center line of the rotatable shaft.

6. A drive system as claimed in claim 3, characterized in that the straight lines which together constitute the running surface are each tangent to a torus of constant diameter about the ellipse, which is obtained by intersection of a cylinder whose axis is the center line of the rotatable shaft and which passes through the centers of the relevant bowl-like recesses, by a plane extending through the centers of the bowl-like recesses and enclosing an angle with the center line of the rotatable shaft, the radius of the torus being equal to the difference between the radius of the bowl-like recesses and the height of camber of the sphere segments forming the sliding bodies.

7. A drive system as claimed in claim 1, in which each of the drive rods is provided with a drive rod head comprising two spherical faces which face each other or which are remote from each other, each face cooperating with a sliding body, the flat side of which cooperates with a running surface on the plate which is connected to the rotatable shaft, characterized in that each of the two running surfaces is formed by a set of straight lines, each of these straight lines of each running surface being at least substantially tangent to a torus of constant diameter about the ellipse obtained by intersection of a cylinder whose axis is the center of the rotatable shaft and which extends through the center of the relevant spherical face, by a flat plane extending through the center of the relevant spherical face, these two faces being parallel to each other, the radius of the torus associated with each of the running surfaces being equal to the length of the sector from the center of curvature of the spherical face on the flat side of the sliding body.

8. A drive system as claimed in claim 7, in which each of the sliding bodies is formed by a sphere segment, characterized in that for each of the running surfaces the radius of the associated torus is equal to the difference between the radius of the associated bowl-like recess and the height of camber of the sphere segment.

9. A drive system as claimed in claim 7, characterized in that the straight lines of each running surface which are tangent to the associated torus enclose the same angle with the plane through the central line of the torus.

10. A drive system as claimed in claim 6, characterized in that for each running surface the straight lines which are tangent to the associated torus form part of a conical surface, the symmetry axis of which intersects the center line of the rotatable shaft at an angle at the point at which the plane through the central line of the torus intersects the central line.

11. In a transmission drive system including a frame, a shaft mounted in said frame for rotation about its axis, at least one drive rod reciprocally movable along an axis generally parallel to said shaft axis and including a drive end with a spherical surface, a swash plate secured to and rotatable with said shaft and having a running surface which extends transversely of the shaft axis and defines therewith an angle, a sliding body operable with each of said drive rods, said body having opposite first and second sides, said first side defining a flat surface in sliding engagement with said running surface of the plate, and said second side defining a spherical surface in sliding engagement with the spherical surface of said drive end of the drive rod, the improvement in combination therewith wherein said running surface of the plate is convex at least in the direction of movement of said sliding body relative to said running surface.

12. Apparatus according to claim 11 wherein said running surface is conical.

13. Apparatus according to claim 11 wherein each of said sliding bodies is generally hemispherical, and the drive end of each drive rod comprises a spherically curved recess in which is engaged the spherical surface of one of said sliding bodies.

14. Apparatus according to claim 13 wherein said plate has axially spaced opposite running surfaces, and wherein said drive end of each drive rod comprises a pair of axially spaced facing spherical surfaces, the apparatus further comprising a pair of said hemispherical sliding bodies engaging said pair of facing surfaces, with the flat sides of said pair of bodies engaging said opposite running surfaces of said plate.

* * * * *